(12) United States Patent
Kirzinger et al.

(10) Patent No.: US 10,882,702 B2
(45) Date of Patent: Jan. 5, 2021

(54) METHOD AND APPARATUS FOR HANDLING PIECE GOODS MOVED IN AT LEAST TWO PARALLEL ROWS

(71) Applicant: KRONES Aktiengesellschaft, Neutraubling (DE)

(72) Inventors: Johannes Kirzinger, Unterhaching (DE); Manuel Kollmuss, Raubling (DE)

(73) Assignee: KRONES Aktiengesellschaft, Neutraubling (DE)

( * ) Notice: Subject to any disclaimer, the term of this patent is extended or adjusted under 35 U.S.C. 154(b) by 186 days.

(21) Appl. No.: 16/093,321

(22) PCT Filed: Mar. 21, 2017

(86) PCT No.: PCT/EP2017/056654
§ 371 (c)(1),
(2) Date: Oct. 12, 2018

(87) PCT Pub. No.: WO2017/182217
PCT Pub. Date: Oct. 26, 2017

(65) Prior Publication Data
US 2020/0180870 A1 Jun. 11, 2020

(30) Foreign Application Priority Data
Apr. 20, 2016 (DE) .................... 10 2016 206 639

(51) Int. Cl.
*B65G 47/08* (2006.01)
*B25J 9/00* (2006.01)
(Continued)

(52) U.S. Cl.
CPC .......... *B65G 47/086* (2013.01); *B25J 9/0093* (2013.01); *B25J 9/1687* (2013.01); *B25J 15/00* (2013.01); *B65G 47/902* (2013.01)

(58) Field of Classification Search
CPC .. B65G 47/088; B65G 47/086; B65G 47/084; B65G 47/082; B65G 47/90; B65G 61/00;
(Continued)

(56) References Cited

U.S. PATENT DOCUMENTS

| 5,123,231 A | 6/1992 | Fallas et al. |
| 5,630,311 A * | 5/1997 | Flix .......................... B65B 21/06 198/419.3 |

(Continued)

FOREIGN PATENT DOCUMENTS

| CN | 103787059 A | 5/2014 |
| CN | 102556440 B | 1/2016 |

(Continued)

OTHER PUBLICATIONS

Corresponding Chinese Patent Application First Office Action dated Dec. 27, 2019.

(Continued)

*Primary Examiner* — James R Bidwell
(74) *Attorney, Agent, or Firm* — Simmons Perrine Moyer Bergman PLC (57) ABSTRACT

The invention relates to a method and apparatus (10) for handling piece goods (2) for forming a palletizable layer or partial layer, with the piece goods (2) being moved in at least two parallel rows (1) and the layer comprising a plurality of piece goods (2). At least two piece goods (2) that are transported beside each other in parallel rows (1) are seized in a clamping and/or force-locking and/or form-locking manner, are then spatially separated from the at least two parallel rows (1) and are then brought into a specified relative target position (P1, P2) and/or target alignment in relation to subsequent piece goods (2). The apparatus (10) comprises at least one manipulator (5) for piece goods (2), (Continued)

and at least one transport device (3), where the piece goods (2) arranged in at least two parallel rows (1).

14 Claims, 7 Drawing Sheets

(51) Int. Cl.
*B25J 9/16* (2006.01)
*B25J 15/00* (2006.01)
*B65G 47/90* (2006.01)

(58) Field of Classification Search
CPC .... B65G 47/244; B65G 47/82; B65G 47/902; B25J 9/0093; B25J 9/1687; B25J 15/00
USPC .................................................. 198/426, 429
See application file for complete search history.

(56) References Cited

U.S. PATENT DOCUMENTS

| | | | |
|---|---|---|---|
| 8,047,093 B2 | 11/2011 | Kinoshita et al. | |
| 8,066,468 B2 | 11/2011 | Klein et al. | |
| 8,167,113 B2 | 5/2012 | Mougin et al. | |
| 8,210,068 B2 | 7/2012 | Feng | |
| 8,448,411 B2 | 5/2013 | Huber et al. | |
| 9,708,089 B2 | 7/2017 | Lang | |
| 2005/0246056 A1 | 11/2005 | Marks et al. | |
| 2010/0147650 A1 | 6/2010 | Kaes et al. | |
| 2012/0009053 A1* | 1/2012 | Boschi | B65G 47/086 414/799 |
| 2013/0282165 A1* | 10/2013 | Pankratov | B65G 57/09 700/217 |
| 2014/0119875 A1* | 5/2014 | Job | B65G 47/918 414/752.1 |
| 2015/0034252 A1* | 2/2015 | Stuhlmann | B65B 17/02 156/566 |

FOREIGN PATENT DOCUMENTS

| | | |
|---|---|---|
| DE | 4439728 | 5/1996 |
| DE | 20108401 | 9/2002 |
| DE | 10219129 | 11/2003 |
| DE | 102009043970 | 3/2011 |
| DE | 102010020847 | 11/2011 |
| DE | 102011076864 | 12/2012 |
| DE | 102011080812 | 2/2013 |
| DE | 102013204095 | 9/2014 |
| DE | 102013207091 A1 | 10/2014 |
| DE | 102013208082 | 11/2014 |
| DE | 102013106004 | 12/2014 |
| DE | 102013108176 A1 | 2/2015 |
| DE | 102013113754 | 6/2015 |
| DE | 102016113448 | 2/2017 |
| EP | 1456101 | 9/2005 |
| EP | 1927559 | 6/2008 |
| EP | 2107018 | 10/2009 |
| EP | 2662293 | 11/2013 |
| EP | 2662319 | 11/2013 |
| EP | 2792626 | 10/2014 |
| FR | 2993870 | 1/2014 |
| JP | S62285817 | 12/1987 |
| WO | 2009149052 A1 | 12/2009 |
| WO | 2010106529 | 9/2010 |
| WO | 2011127367 | 10/2011 |
| WO | 2015014559 | 2/2015 |

OTHER PUBLICATIONS

PCT Application: PCT/EP2017/053836 International Preliminary Report on Patentability dated Oct. 23, 2018.
PCT Application: PCT/EP2017/056654 International Preliminary Report on Patentability dated Oct. 23, 2018.
Chinese First Office Action dated Dec. 2, 2019.
German Application DE 10 2016 206 639.0—German Search Report dated May 7, 2017.
PCT Application: PCT/EP2017/056654—International Search Report dated Jun. 14, 2017.
PCT Application: PCT/EP2017/053836—International Search Report dated Jun. 13, 2017.
European Application No. 17709594.0—Office Action dated Jul. 15, 2020.
European Application No. 17715061.2—Office Action dated Jul. 21, 2020.

* cited by examiner

# METHOD AND APPARATUS FOR HANDLING PIECE GOODS MOVED IN AT LEAST TWO PARALLEL ROWS

CLAIM OF PRIORITY

The present application claims priority to international application PCT/EP2017/056654, filed Mar. 21, 2017, which in turn claims priority to German application DE 10 2016 206 639.0, filed Apr. 20, 2016, which are incorporated by reference.

FIELD OF THE INVENTION

The present invention relates to a method and an apparatus for handling piece goods that are moved in at least two rows.

BACKGROUND OF THE INVENTION

In the known methods for packaging and/or palletizing piece goods, such as packages, bundles, or the like, these are first conveyed on transport devices conveying in lines, and are shifted, aligned, and/or assembled in a suitable manner for producing desired layer patterns that can be subsequently stacked in multiple layers on top of each other, for example on pallets prepared for this purpose. These treatment steps can be particularly useful with facilities for treating beverage containers. The piece goods in question can be, for example, packages, crates, cartons, bundles, or clusters. For the mentioned pallets to be safe for transport, the assembled layer patterns, which are also referred to as assembled cycles, have to meet certain requirements. In order to form such cycles, it is customarily necessary to perform preparatory procedures, which consist, for instance, in first conveying piece goods regularly or stepwise on a so-called dosing belt, in then grouping or gathering them on an intermediate transport belt, and in delivering them together and/or in groups from there to a layer-forming belt or a layer-forming table.

In the prior art it is known to deliver spaced-apart piece goods from a dosing belt onto a transport belt, which means that in each instance individual piece goods are delivered to the transport belt. This delivery can be carried out by each individual piece good being individually delivered onto the transport belt by way of a velocity difference between dosing belt and transport belt; a control by optical sensors, for example light barriers, can additionally be in place. It is likewise conceivable to deliver the piece goods in a spaced-apart manner from the transport belt by way of operating the layer-forming belt in a stepwise manner. In order to deliver in each instance individual piece goods from the transport belt onto the layer-forming belt in such a manner, the layer-forming belt can be operated in steps that are synchronized with the transport belt by exactly one length of a piece good in transport direction. These cycles or groups or parts of grouped piece goods can also be rotated on the transport belt according to the desired layer pattern in order to then be delivered to the layer-forming belt.

Prior art knows different embodiment variants for designing grouping tables that serve to bring together piece goods, such as cartons, shrink packs, trays, and plastic crates. Piece goods can be brought together by being assembled into a two-dimensional formation (block construction, e.g. pallet layer), for example. For this purpose, a roller conveyor, for instance, can be supplied linearly from one or several lanes. According to requirements, the piece goods can be rotated prior to or on the roller conveyor, and they can be arranged in the required positions mechanically by stop points. The piece goods positioned in such a way can then be pushed off from the roller conveyor in a direction orthogonal to the transport direction. Supplying, arranging, and pushing off the piece goods can in this context be regarded as a cycle. At least one cycle is needed to assemble one layer, normally, however, a plurality of cycles is needed. The partly discontinuous conveyance with its relatively abrupt speed changes or direction changes causes accordingly high mechanical stress on the piece goods, which is possibly detrimental to product-protective processing of the piece goods.

Document EP 1 456 101 A2 discloses an apparatus for forming rows from packaging goods for bundle palletizers. The bundle palletizer comprises at least one layer station and at least one palletizing station. The row forming apparatus comprises at least one positioning station, on which the packaging goods are arranged at desired spaces in at least one row during the transport. The positioning station connects to a staging conveyor associated with the layer station. At least one accumulating conveyor is disposed upstream from the positioning station, which has several conveyor sections arranged consecutively in transport direction with controllable and regulatable drives. The controllable and regulatable drives make it possible to achieve the desired spacing for the packaging goods. The row forming apparatus has at least one monitoring device for identifying and monitoring the spacing of the packaging goods. The construction of this known row forming apparatus is rather elaborate and complicated, especially as many belts are required for forming the spaces and/or for rotating the packaging goods.

An apparatus is known from U.S. Pat. No. 5,123,231 A for assembling articles into groups and subsequently packaging them. On a feeder belt and in each instance with predefined spaces, the articles are fed to a collection belt where the groups are assembled from an unvarying number of articles. The groups are then fed to a subsequent belt of a packaging device.

The primary objective of the invention is to enable exact and precise manipulation and handling of piece goods that are conveyed or transported in at least two parallel rows. The corresponding apparatus should operate faster than the manipulation devices known from the prior art, and this with at least approximately the same reliability and approximately the same positioning precision.

These objects of the invention are achieved by the subject matters of the independent claims, that is, by a method and an apparatus for handling piece goods moved one after another in at least two parallel rows, the method and the apparatus comprising the features of the independent claims. Features of advantageous further developments of the invention are indicated in the relevant independent claims.

SUMMARY OF THE INVENTION

The invention relates to a method and an apparatus or handling apparatus for handling piece goods moved one after another in at least two parallel rows thereby forming a palletizable layer or partial layer comprising a plurality of piece goods. A corresponding handling apparatus is described in the German priority application with the file number 10 2016 206 639.0, the contents of which are fully incorporated into the context of the present application. If therefore simply a "method", a "method variant", the "method according to the invention" or the like is referred to in the context of the present description, this is intended to generally mean the mentioned method for handling piece goods moved one after another in at least two rows. If, furthermore, simply an "apparatus", a "handling apparatus", an "apparatus variant of the apparatus according to the invention" or the like is referred to in the context of the present description, this is intended to generally mean the mentioned apparatus for handling piece goods that are moved one after another in at least two rows. If "handling of piece goods" is referred to here, in the exemplary embodiments, in the claims, and/or in the context of the entire description disclosure, this is intended to comprise handling, seizing, positioning, moving in space, rotating, aligning, etc., in particular in the context of a manipulator and/or movable parts of the manipulator that are disposed in a seizing space or seizing range and that can move there within definable limits. The term of handling, however, likewise comprises positioning steps, conveying steps, and/or any types of handling steps that can take place in the context of conveying devices, horizontal conveying devices, transport belts, etc. that are part of the apparatus according to the invention and/or are in operative connection and/or in a transport connection therewith, be they parts that are arranged downstream or upstream in transport direction and/or conveying direction, or be they integrated parts of the apparatus according to the invention.

If an "unchanged" or "new" alignment is referred to in the context of the presently described apparatus, this is intended to mean, in particular, the angular alignment of piece goods that are previously seized and moved and/or shifted and/or rotated by the manipulator. "Seizing" in the present context usually means gripping a piece good or a plurality of piece goods simultaneously in a physical, form-locking and/or force-locking and/or clamping manner, as well as the handling thereof up to the point of reaching the target position and/or target alignment.

The piece goods can be articles, packaging items, container sets, bundles, cartons, or the like moved one after another in one row. It can be provided, for example, that a plurality of articles of the same or of different kinds are gathered together in a bundle or in a mixed bundle by an external cardboard packaging, by a strapping or by a plurality of strappings, by a film packaging, or the like. Furthermore, a plurality of beverage containers held together, for example, by a shrink wrap, by a strapping tape or a plurality of strapping tapes, can in each instance form one piece good. The piece goods moved one after another in one row can in this context be formed to be the same or to be different, according to requirements of subsequent handling apparatuses.

In accordance with the invention, it is provided that in at least one method step for forming a palletizable layer or partial layer at least two piece goods transported side by side in parallel rows are seized by the manipulator in a clamping and/or force-locking and/or form-locking manner, spatially separated from the at least two parallel rows and brought into a defined relative target position and/or target alignment in relation to subsequent piece goods of the at least two parallel rows.

The apparatus, by which the aforementioned method can preferably be carried out and which apparatus serves to handle piece goods moved one after another in at least two parallel rows, comprises at least one first transport device and at least one manipulator. The at least one first transport device serves for feeding the piece goods fed in at least two parallel rows to a seizing range of the at least one manipulator.

The at least one manipulator is typically/preferably designed for seizing and/or receiving at least one piece good from at least one of the two feeding parallel rows within the manipulator seizing range in a clamping and/or form-locking and/or force-locking manner, as well as for separating and transferring the at least one piece good into a target position within the manipulator seizing range. The manipulator can be designed, for example, as parallel kinematic robot or as part of such, in particular as tripod or gantry robot, multi-axis robot, etc. and has, in accordance with an embodiment, at least two clamping elements and/or gripping elements located opposite one other, in particular, located pairwise opposite one other, which clamping elements and/or gripping elements in particular interact with each other in a pairwise manner. This definition of the clamping elements and/or gripping elements of the manipulator also comprises, for example, double grippers or multiple grippers or the like, which can have a plurality of gripper pairs, which gripper pairs, however, particularly interact pairwise in order to be able to receive, seize, and/or grip piece goods, for example, from a plurality of parallel, in particular, spaced-apart rows. It should thus be noted that the number of at least two clamping elements and/or gripping elements located opposite each other defines a minimum. According to one embodiment, the manipulator thus has at least one gripper head with clamping jaws that are rigid, movable, or advanceable toward one other, between which clamping jaws the at least one piece good can be clamped and can thereby be moved to the target position accordingly.

The manipulator is in particular part of a so-called grouping module, which also comprises a horizontal conveying device, wherein the horizontal conveying device is associated with the seizing range of the at least one manipulator and/or at least largely corresponds to the seizing range of the manipulator. According to one embodiment of the invention, the horizontal conveying device produces a continuous feed in transport direction of the piece goods. In analogy to the transport device, the horizontal conveying device can be, for example, an endless conveyor, a conveyor mat, or the like, on the top side of which the piece goods are transported. As will become clear in the following from the figures, the horizontal conveying device can optionally also be a so-called transporting table, sliding table, grouping table, or the like, that can provide for the largely or approximately constant movement of the piece goods located thereon and/or of the piece goods shifted thereon into the particular target position and/or rotated into the particular target alignment by the manipulator. It can be alternatively provided that the horizontal conveying device consists, for example, of a plurality of adjacently disposed conveyor belts all moving at the same speed.

It is also not imperative that transport device and horizontal conveying device are formed by two conveyors that are driven independently of one another. Instead, it can be optionally provided that these are only spatially separate areas of one single conveyor, the areas adjoining one another in the conveying direction. A first transport area in this case serves, in particular, for feeding the at least largely unspaced piece goods arranged as formation in at least one row. A second manipulating range or horizontal conveyor range then serves, in particular, for manipulating at least one piece good of the formation or of a group of adjacent piece goods of the formation by way of the manipulator. In this context it is important that the piece goods of the formation, which, although located within the seizing range of the manipulator, are however not (yet) seized and being processed by the manipulator, are moved further along approximately continuously and preferably at a constant speed.

According to one embodiment of the invention, the at least one manipulator or a part of the at least one manipulator provided for the transfer of the at least one piece good to the target position and/or target alignment, moves at approximately the same speed or at the same speed as the at least one horizontal conveying device that is driven preferably interruption-free, upon a complete transfer of the at least one piece good to the target position and/or to the target alignment. This applies preferably at least while the piece good or piece goods are being seized and immediately before and after this moment, and this can also be referred to as "sync-up" of the manipulator to the moving piece goods of the formation.

In this instance as well as generally in the context of the present invention, this part of the manipulator provided for the transfer of at least one piece good to the target position and/or target alignment can be, for example, a tool head, a gripper head, or the like, which is, for example, attached and mounted on movably mounted cantilever arms, which in turn are typically mounted in a frame-fixed manner on a frame or the like. Such a manipulator suspension or manipulator arrangement, as the case may be—also known as parallel kinematic arrangement—enables the desired movability of the head (also: of the manipulator), which can seize, shift, position, place, rotate, etc. the piece goods in the desired manner for moving toward the target positions and/or target alignments for the piece goods.

Preferably, it is also intended that piece goods from two directly adjacent rows of the at least two parallel rows are fed into the seizing range essentially without a spacing from each other. For this purpose, the piece goods of the two directly adjacent rows are arranged either on two directly adjoining transport devices or on a joint transport device.

Alternatively, it can be provided that a defined spacing is provided between the two directly adjacent rows, which allows the manipulator to engage between the two rows and thus also to seize and manipulate a piece good of one of the two rows. If two piece goods from both rows are to be seized simultaneously, they are pushed together during seizure by the manipulator, in particular by its clamping elements and/or gripping elements that can be moved towards each other.

According to an embodiment, the piece goods are moved without gaps between each other or with minimal gaps between each other within each of the at least two parallel rows and/or are being conveyed to an area—referred to, in particular, as manipulating range or seizing range, as the case may be. This means that according to this embodiment the immediately consecutive piece goods within a row are transported to the seizing range in a closed formation. The term "closed formation" is intended to mean a largely unspaced succession of piece goods transported one after another. The closed formation in the sense of the present invention can be of finite length and comprise a limited number of piece goods, whereupon a space can follow, and upon such a space another such formation can follow which is subsequently transported. Such a sequence can be repeated, too, if applicable, a plurality or a multitude or an undefined number of times. The closed formation can also be transported as an endless formation that has no interruption and comprises an optional number of piece goods. At least one transported piece good is seized in a clamping and/or force-locking and/or form-locking manner from this closed formation; is spatially separated from the closed formation; and is brought into a specified relative target position and/or target alignment in relation to subsequent piece goods of the formation. If "seizing" of piece goods in a "clamping manner" is referred to in the context of the present invention, this is intended to also comprise seizing, gripping, or receiving piece goods in a force-locking and/or friction-locking manner. All the variants of receiving, seizing, and/or gripping piece goods can be likewise combined with seizing, gripping, or receiving the piece goods in a form-locking manner. If a "target position" and/or "target alignment" is referred to in the context of the present invention, this is intended to mean, in particular, that the piece goods are seized, shifted, and/or rotated; and it is also possible that the piece goods are optionally only shifted (without rotation) or only rotated (without shifting movement), as the case may be. During shifting, the seized piece goods can in particular be moved in alignment to the subsequent piece goods, so that the piece goods in the target position are located in the transport direction with a greater spacing in front of the subsequent piece goods. Furthermore, an angular component can be applied during the shifting movement so that the seized piece goods are arranged in the target position with a lateral offset to the subsequent piece goods. If the piece goods are rotated simultaneously during movement to the target position and/or target alignment, rotations of 90°, 180° or 270° are preferred, depending on the layer scheme to be produced.

When feeding the piece goods in each instance in closed formation within the at least two parallel rows, whereby no distance or only a defined distance, in particular a small distance, is provided between the at least two directly adjacent rows, the clamping elements and/or gripping elements of the manipulator that are advanceable toward each other for seizing at least one piece good from each of the at least two parallel rows can be arranged in a first working position parallel to the transport direction of the feeding piece goods to simultaneously seize at least one piece good at the front position from each of the at least two parallel rows.

As a differing option that can nevertheless refer to some embodiment variants of the method according to the invention for handling piece goods moved one after another in at least two parallel rows and/or of the apparatus according to the invention, in deviation to this the piece goods can also be transported to the manipulator or its seizing range in a timed or synchronized feed. This describes the conveying of piece goods in at least two parallel rows, with defined gaps between the individual piece goods within each row. Furthermore, timed or synchronized feed describes the feeding of piece good groups, each group comprising a defined number of at least two piece goods, with gaps between such individual piece goods and/or piece good groups. Depending on the layer scheme to be generated, for example, correspondingly spaced piece goods and/or piece good groups within a row can be fed into the seizing range of the manipulator, with gaps of equal size or different size optionally being provided between the individual piece goods and/or piece good groups. Such a sequence can be repeated, too, if applicable, a plurality or a multitude or an undefined number of times, preferably in regular sequence, however also in cyclically regular patterns or even in irregular succession, as the case may be.

According to one embodiment, it is provided that the cycle formation takes place directly before the entry of the piece goods of the at least two parallel rows into the seizing range of the manipulator. For example, for this purpose the handling apparatus comprises at least one grouping belt for creating defined gaps between the piece goods fed in at least two parallel rows and the subsequent piece goods and/or for creating groups comprising at least two piece goods and the subsequent piece goods. In particular, each of the at least two parallel rows can be assigned its own grouping belt. Alternatively, a joint grouping belt can also be provided so that equal gaps are generated between the synchronized piece goods and/or piece good groups within each of the at least two parallel rows. If, on the other hand, several grouping belts are used, it may be necessary to synchronize directly adjacent grouping belts accordingly in order to generate identical cycles within directly adjacent rows.

Preferentially, the piece goods on two or more directly adjacent rows are subdivided into identical individual piece goods or piece good groups entering the seizing range synchronously. According to an embodiment comprising at least three parallel rows, it can be provided, for example, that identical cycles of individual piece goods or piece good groups are formed on all rows. Alternatively, it can be provided, for example, that only on two directly adjacent parallel rows a separation of a single piece good or a piece good group per row takes place synchronously, while the piece goods of the third and, if necessary, further rows are fed unchanged into the seizing range.

According to an embodiment, at least two piece goods or piece good groups are seized in one method step from at least two adjacent parallel rows, wherein the two piece goods or piece good groups each have been spaced in advance by a gap from the subsequent piece goods of the at least two parallel rows and wherein the two piece goods or piece good groups are spatially separated from the subsequent piece goods and brought into a defined relative target position and/or target alignment in relation to the subsequent piece goods.

If individual piece goods and/or piece good groups of the at least two parallel rows are fed in cycles, the manipulator can be aligned in a second working position in such a way that the clamping elements and/or gripping elements that can be advanced against each other are arranged perpendicular to the transport direction of the infeeding piece goods in order to receive at least one piece good from each of the at least two parallel rows, wherein in particular one of the clamping elements and/or gripping elements being arranged in the transport direction in front of the piece goods to be seized and the other clamping element and/or gripping element being arranged in the transport direction behind the piece goods to be seized, in particular within the gap between the piece goods to be seized and the subsequent piece goods.

It is preferably provided that in the moment of seizing at least one piece good, there is no back pressure or at the most a very small back pressure between this piece good and the directly following piece goods of each row. If a back pressure does build up while the piece goods are advanced, this back pressure is preferably dissipated prior to the seizing of at least one piece good; this can be achieved, for example, by selecting a suitable surface of the transport device for the piece goods moved in rows one after another. In particular, it can be provided that the surface of the transport device is rubberized in order to prevent slipping of the piece goods on the transport device or in order to dissipate or at least significantly reduce the back pressure of the constantly fed piece good row, as the case may be.

When seizing the at least one piece good from at least one of the at least two parallel rows, this piece good is normally not decelerated in its movement in transport direction of the piece good row. Instead, the at least one piece good receives at least one additional velocity component and/or direction component after being seized by the manipulator of the apparatus; and the velocity component in this context must not be negative in relation to the speed of the piece goods within the row, and the direction component must not be directed against the transport direction of the piece goods within the row. Otherwise, there would be a risk of collision between the seized piece good and the following piece good that is now located foremost within each row.

When seizing the piece goods the manipulator can be loaded symmetrically or asymmetrically. In the case of symmetrical loading, the clamping elements and/or gripping elements are in contact with the seized piece goods along their entire length. In the case of asymmetrical loading, however, the clamping and/or gripping elements are only in contact with registered piece goods over a first partial length extending from a free end. However, the second section extending to the opposite free end of the clamping elements and/or gripping elements is free.

It may also be provided that the advancing movement of the clamping elements and/or gripping elements of the manipulator can be used to adapt and/or adjust a suitable distance between the clamping elements and/or gripping elements before seizure of the piece goods. For example, if the piece goods are supplied in three or more parallel rows, it may be necessary in one method step to seize adjacent piece goods from two parallel rows, meanwhile in a later method step piece goods from three parallel rows or just from a single row are seized. Hereby it is advantageous to adjust the suitable distance between the clamping elements and/or gripping elements in advance before the manipulator seizes the piece goods in order to avoid a collision of the clamping elements and/or gripping elements with the piece goods to be seized and/or with piece goods not to be seized, for example piece goods from adjacent parallel rows.

Moreover, it can preferably be provided that the apparatus or the handling apparatus comprises a control device for controlling the manipulator, which control device can, in particular, be formed by a processor-controlled control unit that can be equipped with variable and/or programmable control programs. In particular, this control device controls the manipulator in such a way that the manipulator seizes at least one piece good in a clamping and/or force-locking and/or form-locking manner from at least one of the at least two feeding rows; spatially separates the at least one seized piece good and brings it into the particular specified target position and/or target alignment. This control device optionally also controls two or more manipulators such that these manipulators seize in each instance at least one piece good in a clamping and/or form-locking and/or force-locking manner, each spatially separate the at least one seized piece good and bring it into the particular specified target positions and/or target alignment.

The control device typically contains information on a great multitude of variants; more precisely, information, in particular, on a group to be formed from a multitude of piece goods for a palletizable layer or also for different layer patterns can be stored in the control device. In this context, the particular target positions and/or target alignments of the piece goods form a part of the information and assign a specific position and/or a relative orientation in the particular group to the particular at least one piece good.

In addition, the control device can control and regulate the means of conveyance of the handling apparatus, for example, at least one transport device infeeding the piece goods and the at least one horizontal conveying device of the grouping module. Furthermore, it may be provided that the control device controls and/or regulates the at least one grouping belt for the cycle formation and for the separation of individual piece goods and/or piece good groups from the piece goods that are supplied in at least two parallel rows in order to prepare the cycles for the manipulator according to the desired layer scheme.

A particular advantage of the method and the apparatus lies therein that the manipulator can perform a grouping and/or alignment of at least one piece good in one single manipulation step. The method according to the invention and the apparatus according to the invention thus make it possible to save operating costs in the ongoing packaging operation and/or palletizing operation as well as to save system costs, since fewer drives are required in the piece good infeed. The capacity and thus the throughput can moreover be significantly increased in relation to the customarily known systems.

The invention also refers to a conveying, processing and/or packaging facility for piece goods comprising an aforementioned apparatus for handling piece goods moving in at least two parallel rows. Alternatively, or in addition to the features described, the apparatus may include one or more features of the method described above. The process may also alternatively or additionally show individual or several features of the described apparatus.

BRIEF DESCRIPTION OF THE FIGURES

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

The same or equivalent elements of the invention are designated in FIGS. 1 to 14 using identical reference characters. Furthermore, and for the sake of clarity, only the reference characters relevant for describing the individual figures are used. It should be understood that drawings of the detailed description and specific examples of the embodiments of the apparatus and of the method according to the invention are intended for purposes of illustration only and are not intended to limit the scope of the invention or of the inventive idea.

DETAILED DESCRIPTION OF THE INVENTION

FIGS. 1 to 4 show in schematic top views a sensible temporal sequence of a first exemplary embodiment of a method for handling piece goods 2, 2a, 2b, 2c moving one behind the other in at least two parallel rows 1, 1a, 1b, 1c by a handling apparatus 10 equipped for this purpose.

The handling apparatus 10 shown comprises three parallel transport devices 3, 3a, 3b, 3c, via which directly successive piece goods 2a, 2b, 2c are transported without interruption and/or at a continuous transport speed v3 into a seizing range 4 of at least one manipulator 5 of a grouping module 20 of the handling apparatus 10. Hereby, the piece goods 2a, 2b in the directly adjacent rows 1a, 1b are transported so close together that the piece goods 2a, 2b of the directly adjacent rows 1a, 1b essentially contact each other. In this embodiment, the third row 1c is arranged laterally spaced apart from the rows 1a, 1b. In the present context, the seizing range 4 refers, in particular, to the maximum and/or to the in each instance program-controlled specified movement range of the manipulator 5. The seizing range 4 or the outer spatial limitation of the seizing range 4 may be larger than specified by the external boundaries of the horizontal conveying device 6, on the approximately horizontal upper side of which the piece goods 2a, 2b, 2c are conveyed and/or positioned and/or shifted by the manipulator 5. Normally, however, the seizing range 4 of the manipulator 5 is the expedient range of movement where the piece goods 2a, 2b, 2c that are to be seized can be situated and/or where the seized piece goods 2*; 2a*, 2b*, 2c* can be deposited and positioned.

The rows 1, 1a, 1b, 1c of piece goods 2, 2a, 2b, 2c shown here in FIGS. 1 to 4 can, for example, be uninterruptedly continuously conveyed on transport devices 3a, 3b, 3c in transport direction TR in this arrangement. By grouping belts 18, 18a, 18b, 18c arranged between the transport devices 3a, 3b, 3c and the grouping module 20, respective piece goods groups 7a, 7b are separated from piece goods 2a, 2b that are fed in closed rows 1a, 1b. In particular or preferably the grouping belts 18a, 18b work synchronously, so that corresponding piece good groups 7a, 7b are formed, each comprising the same number of piece goods 2a, 2b. The transport devices 3a, 3b, 3c and the grouping belts 18a, 18b, 18c are shown wider (only) in FIG. 2 for further understanding.

The number of piece goods 2a, 2b in the respectively formed piece good groups 7a, 7b sensibly depends on the respective desired layer scheme or on the processing speed of the respectively used manipulator 5 or on the maximum movement speeds of the moving parts of the manipulator 5 to be maintained in the long term during regular operation, as the case may be.

Piece goods 2 in terms of the present invention or of the described exemplary embodiment can be, for example, individual articles, packages, or bundles. Packages or bundles can be, for example, shrink wrap bundles and/or strapped bundles or the like, with a plurality of articles, such as, in particular, containers, liquid containers and/or beverage containers that are normally gathered together in bundles. In accordance with the invention the articles, packages or piece goods can, however, basically be cuboid or differently shaped packages of various types, which can be seized and gripped without interference by the aforementioned manipulator 5.

As already mentioned, it is optionally possible that the piece goods 2, 2a, 2b are transported to the seizing range 4 of the manipulator 5 of the grouping module 20 in several rows, especially arranged in several parallel rows, on one transport device 3 or on several transport devices 3a, 3b, 3c, especially on several parallelly arranged transport devices. The parallel rows 1a, 1b, 1c can be transported laterally distanced from each other (i.e. spaced apart transversely with respect to the transport direction TR) or largely without distance from each other on the at least one transport device 3.

The manipulator 5 is designed and equipped for receiving piece goods 2a, 2b, 2c in a clamping and/or form-locking and/or force-locking manner within the seizing range 4 preferentially with two gripper jaws 52 that are advanceable toward each other. The piece goods 2a, 2b, 2c seized by the manipulator 5 are referred to below with the reference characters 2*, 2a*, 2b*, 2c* for the purpose of distinguishing them from the infeeding other piece goods 2a, 2b, 2c.

The manipulator 5 grips, for example, at least one, preferably at least two or three piece goods, separates the piece good(s) and transfers the separated piece good or the separated group of two or three piece goods each into a target position and/or a target alignment. According to FIG. 1, by the grouping belts 18a, 18b one piece goods 2a, 2b each has already been separated from the rows 1a, 1b arriving via the transport devices 3a, 3b. The manipulator 5 is aligned in such a way that the gripper jaws 52 of the manipulator 5 are arranged perpendicular to the transport direction TR of the piece goods 2a, 2b (see FIG. 1). In particular, a first gripper jaw 52a is arranged in transport direction TR in front of the piece goods 2a, 2b to be removed and a second gripper jaw 52b is arranged in transport direction TR in the gap L between the piece goods 2a, 2b to be handled and the downstream piece goods 2a, 2b. The two piece goods 2a, 2b, which are spaced apart from the subsequent piece goods 2a, 2b by the grouping belts 18a, 18b, are jointly gripped by the manipulator 5, separated from the subsequent piece goods 2a, 2b and brought into a target position P1, whereby the unit of the two gripped piece goods 2a*, 2b* is rotated by the manipulator 5 about 90° during the transfer to the target position P1.

Figure 1:
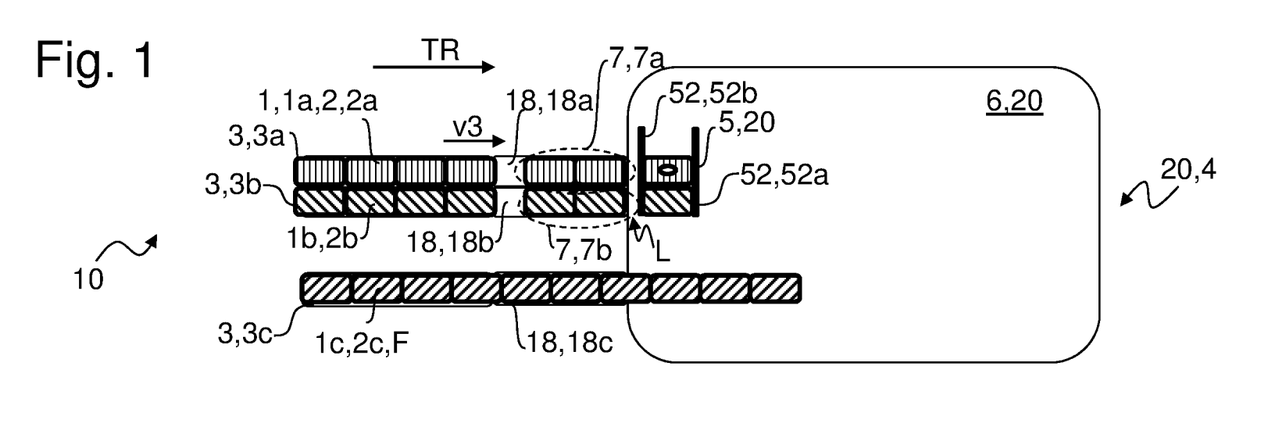
FIGS. 1 to 4 schematically show a temporal sequence of a first exemplary embodiment of an inventive method for handling piece goods moved one after another in at least two parallel rows by a handling apparatus equipped for this purpose.
Figure 2:
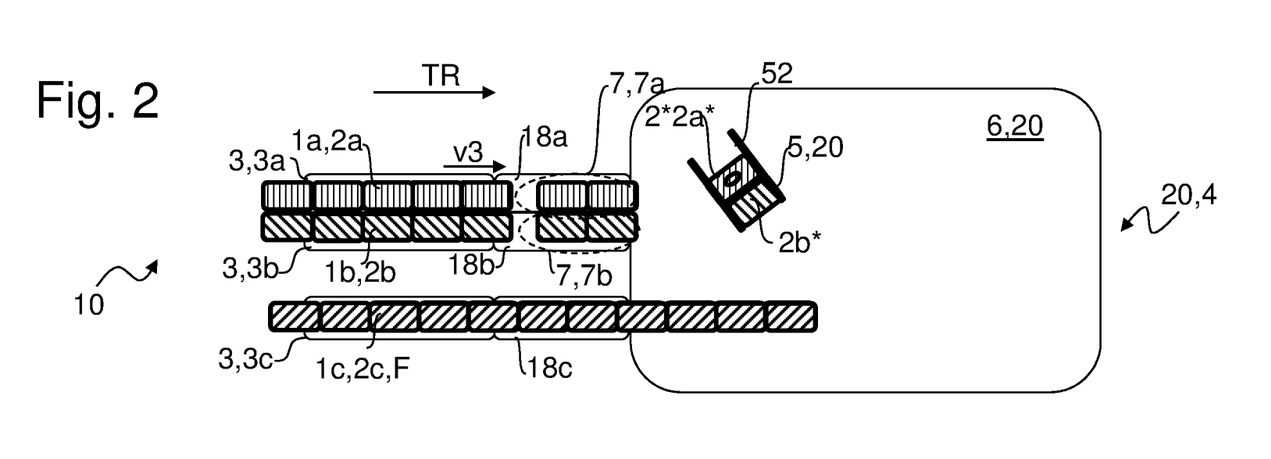
Figure 3:
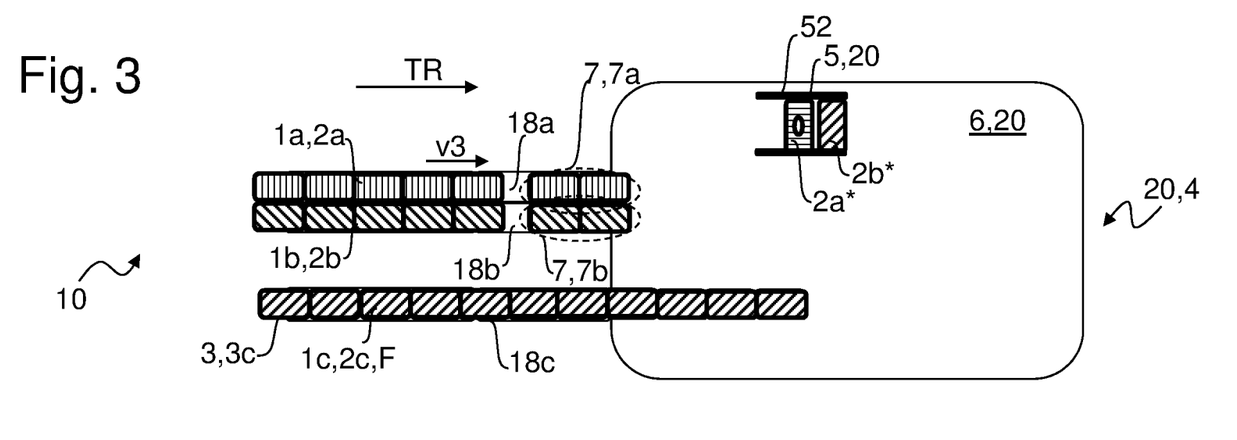
Figure 4:
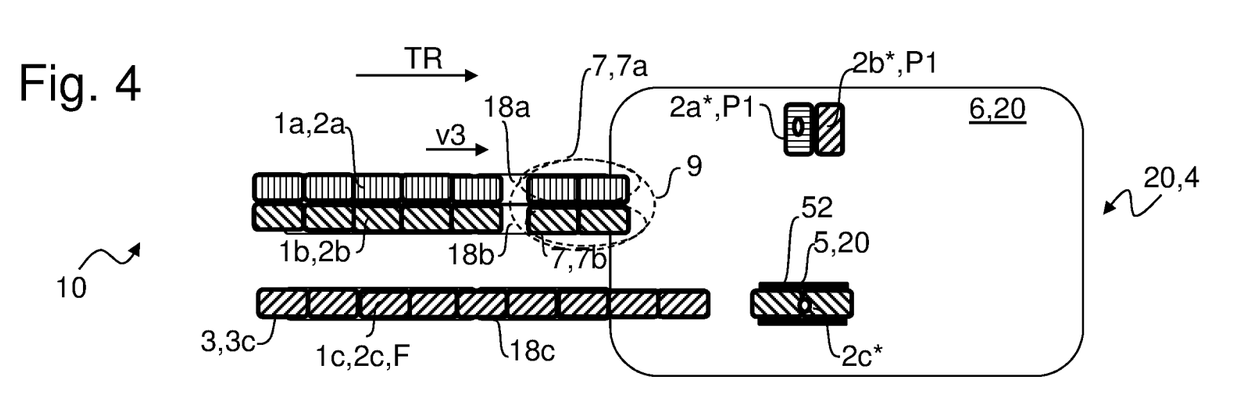
Figure 5:
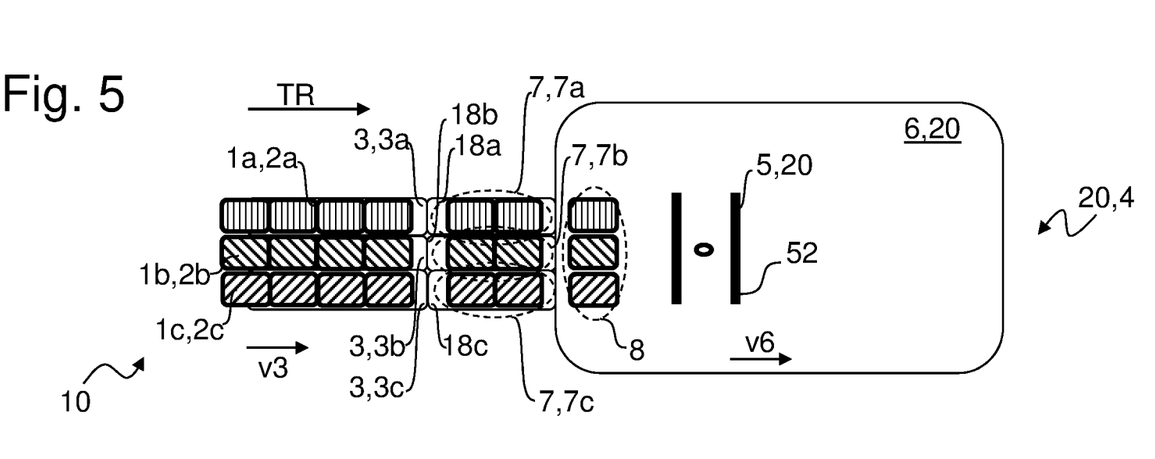
FIGS. 5 to 13 schematically show a temporal sequence of a second exemplary embodiment of an inventive method for handling piece goods moved one after another in three parallel rows by a handling apparatus equipped for this purpose.
Figure 6:
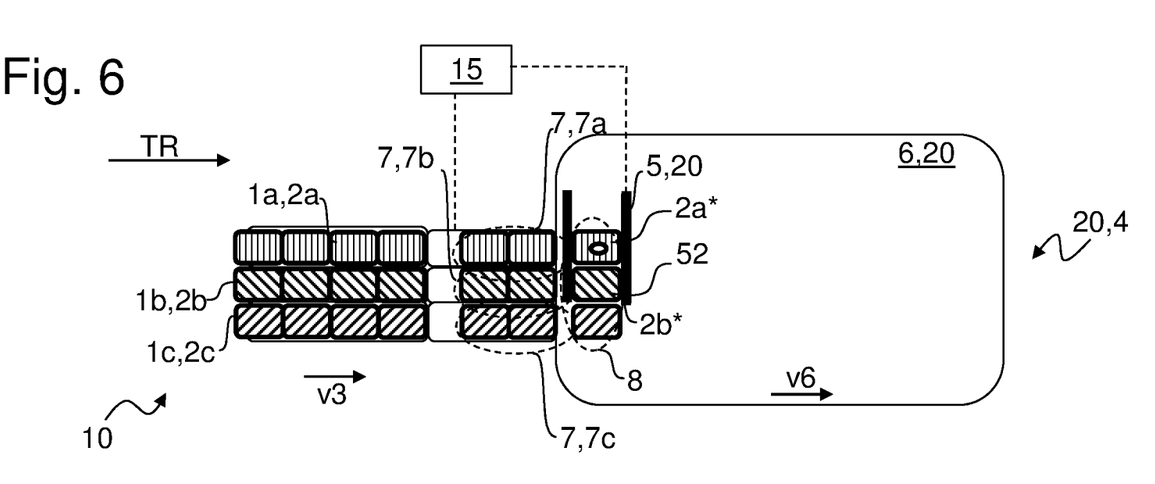
Figure 7:
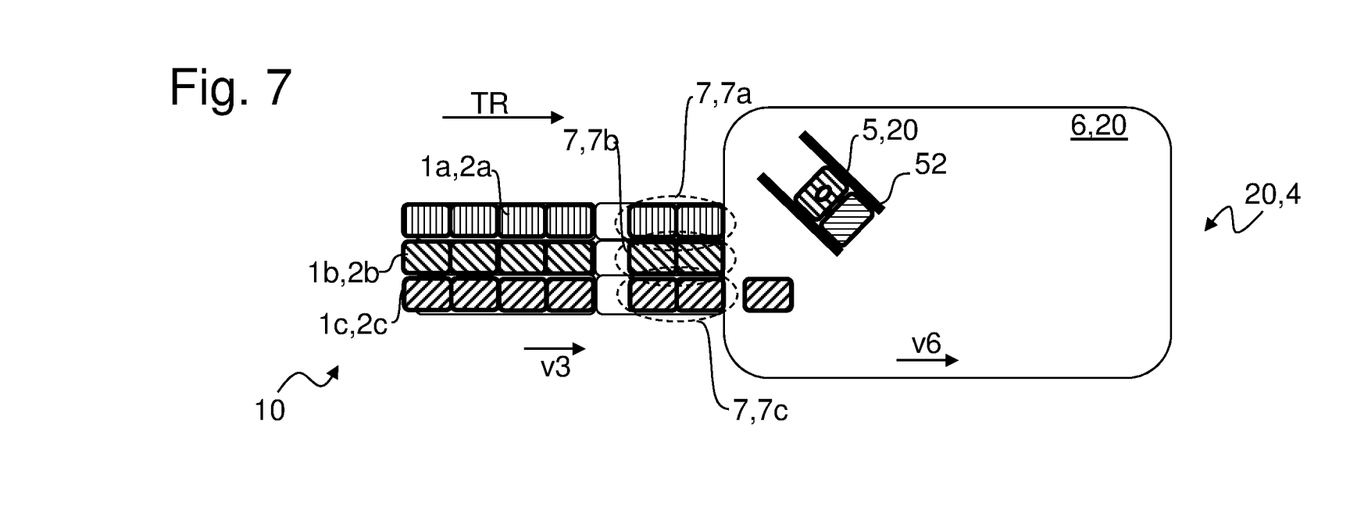
Figure 8:
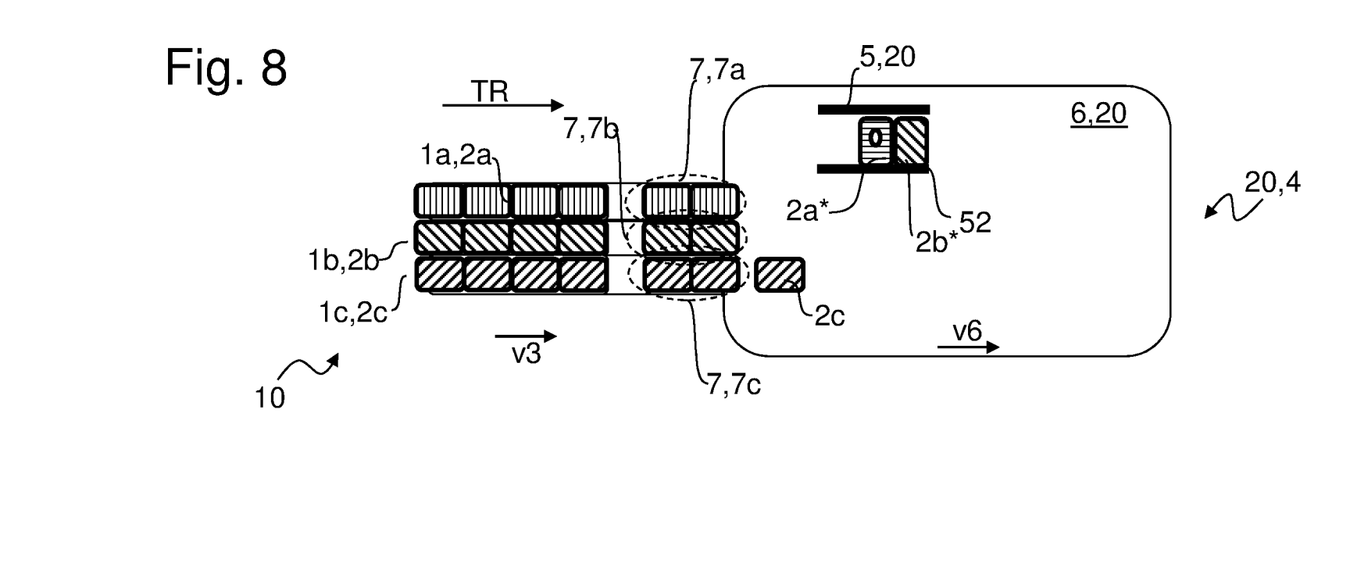
Figure 9:
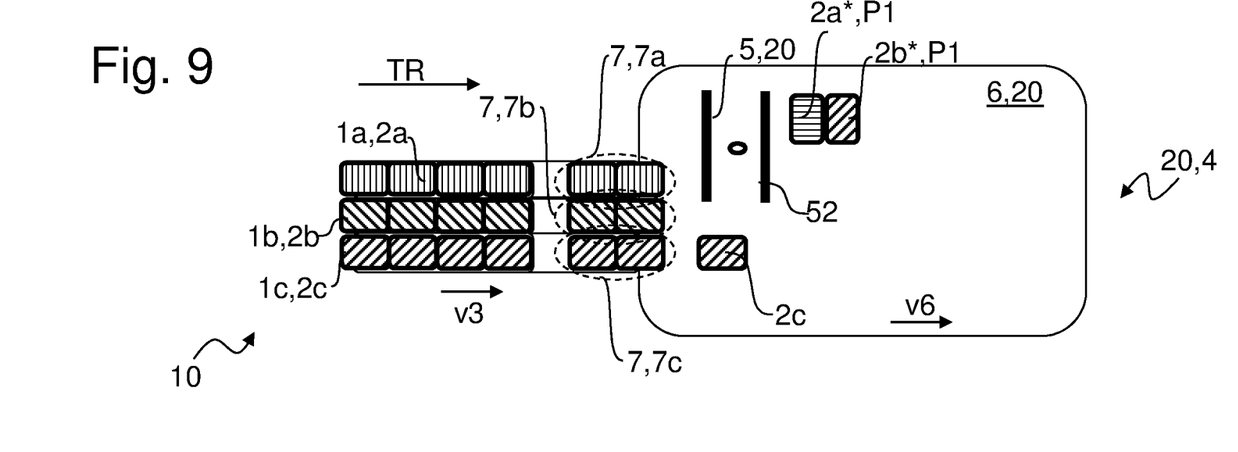
Figure 10:
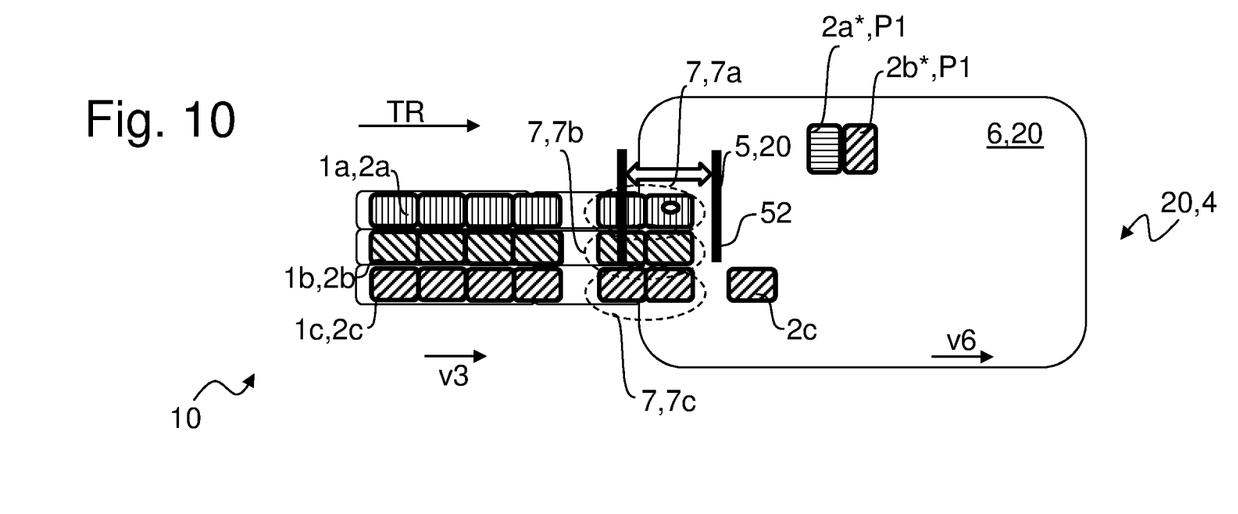
Figure 11:
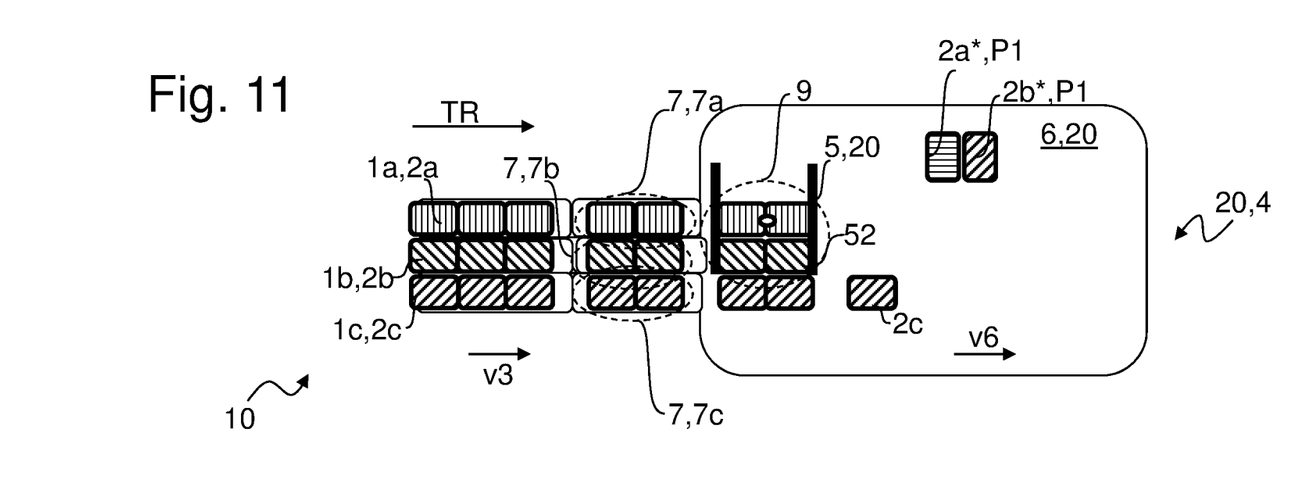
Figure 12:
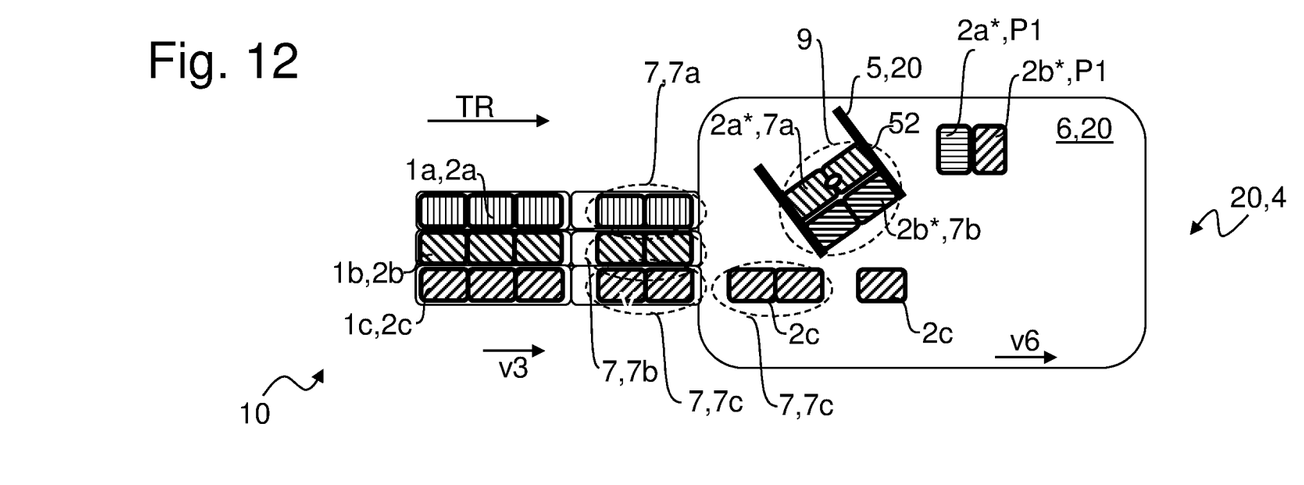
Figure 13:
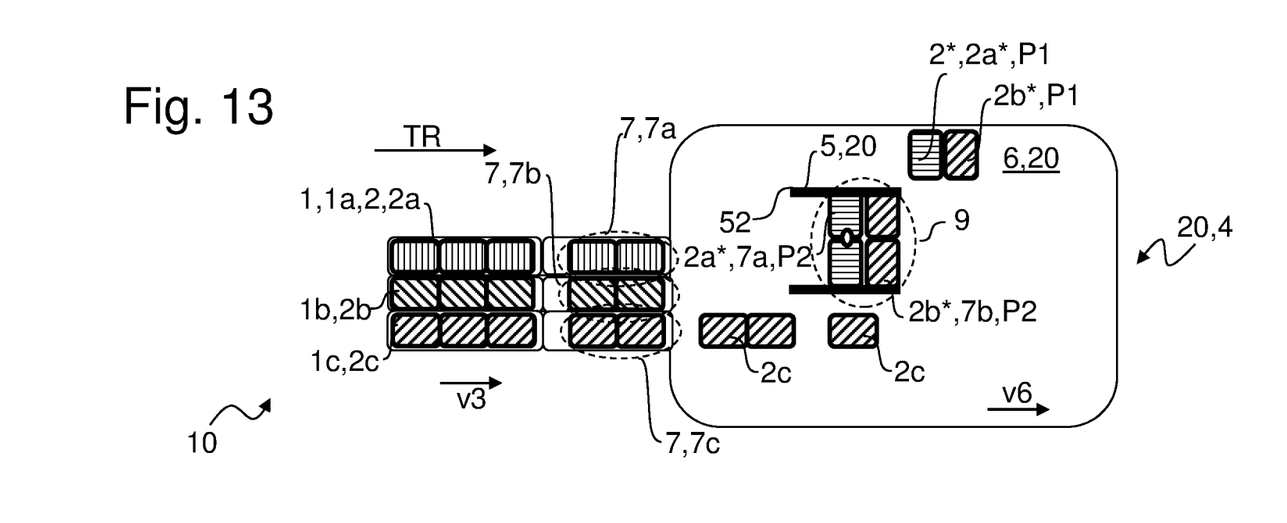

Then, as shown in FIG. 4 as an example, the two foremost piece goods 2c of the distanced row 1c are gripped and moved to a new target position (not finally shown), for example by shifting them in alignment with row 1c. While the above-mentioned method steps are carried out, the grouping belts 18a, 18b separate piece good groups 7a, 7b from the incoming rows 1a, 1b, each group comprising two piece goods 2a, 2b, and prepare these groups for removal by the manipulator 5 in a further method step, the further method step not being shown. In particular, it is intended that the manipulator 5 seizes both piece good groups 7a, 7b at the same time. For this purpose, the gripper jaws 52 of the manipulator are moved apart accordingly in order to be able to receive the unit 9 consisting of the two piece good groups 7a, 7b comprising a total of four piece goods 2a, 2b (this is in particular analogous to FIGS. 10 and 11 described below).

While in the shown method steps gaps L are generated via the grouping belts 18a, 18b between individual frontmost located piece goods 2a, 2b or piece good groups 7a, 7b through separation from the rows 1a, 1b, the piece goods 2c within row 1c are fed in a so-called closed formation F without gaps between each other. This means that the grouping belt 18c is moved continuously at the same speed as the transport device 3c located upstream. Under certain circumstances it may be sensible to use a different transport speed for the transport device 3c than for the transport devices 3a and 3b. In further method steps, not shown here, it is now possible to switch the infeed of piece goods 2a and/or 2b within the row(s) 1a and/or 1b to a gapless supply by moving the grouping belts 18a, 18b with the same speed as the infeeding transport devices 3a, 3b. Depending on the layer scheme to be generated, it may also be sensible to separate piece goods 2c or piece good groups, each piece good group comprising at least two piece goods 2c, from the subsequent piece goods 2c from row 1c by the grouping belt 18c. It would also be conceivable that the piece goods 2c of the row 1c are infeed by a transport device 3c that extends to the horizontal conveying device 6, so that in particular a grouping belt 18c can be dispensed with.

If a manipulator 5 is generalizing referred to in the present case or also generally in the context of the present invention, the part of the manipulator 5 provided for the transfer of at least one piece good 2a*, 2b*, 2c* to the target position P1 and/or target alignment, can concretely be, for example, a tool head, a gripper head, or the like, which is, for example, attached and mounted on movably mounted cantilever arms, which in turn are typically mounted in a frame-fixed manner on a frame or the like. Such a manipulator is disclosed, for example, in DE 10 2016 113 448 A1, the contents of which are hereby to be regarded as part of the description. Such a manipulator suspension or manipulator arrangement, as the case may be—also known as parallel kinematic arrangement—enables the desired movability of the gripper head (also: of the manipulator 5), which can seize, shift, position, place, rotate, etc. the piece goods 2a*, 2b*, 2c* in the desired manner for moving toward the particular target positions P1, P2 and/or target alignments for the piece goods 2a*, 2b*, 2c*. Other suitable manipulator configurations are, however, equally conceivable, for example, such as are carried out with gantry robot guiding and/or gantry robot suspensions or the like. These other or alternative manipulator configurations can optionally relate to individual, several, or all embodiment variants mentioned in the context of the present description of Figures and/or of the entire description of the invention.

The schematic top views of FIGS. 5 to 13 show in a schematic or simplified way a temporal sequence of a second exemplary embodiment of the inventive method for handling piece goods 2a, 2b, 2c by a corresponding handling device 10, the piece goods 2a, 2b, 2c being moved one behind the other in three parallel rows 1a, 1b, 1c. Hereby, the piece goods 2a, 2b, 2c in the parallel rows 1a, 1b, 1c are transported essentially directly adjacent to each other. Analogous to the embodiment shown in FIGS. 1 to 4, a grouping belt 18a, 18b, 18c is arranged between the respective transport devices 3a, 3b, 3c and the horizontal conveying device 6 of the grouping module 20 for the formation of defined gaps between piece goods 2a, 2b, 2c or for the formation of groups 7a, 7b, 7c of piece goods 2a, 2b, 2c within a row 1a, 1b, 1c. The grouping belts 18a, 18b, 18c can be controlled synchronously or depending on the layer scheme to be generated they can be controlled differently, in particular by a control device 15 which is only shown as an example in FIG. 6. For example, according to FIG. 5 first one piece good 2a, 2b, 2c was separated from each row 1a, 1b, 1c and subsequently one group 7a, 7b, 7c was separated from each row 1a, 1b, 1c; the groups 7a, 7b, 7c comprising two piece goods 2a, 2b, 2c each. The unit 8 comprising one of each piece good 2a, 2b and 2c is already within the seizing range 4 of the manipulator 5, while the groups 7a, 7b, 7c are still on the respective grouping belts 18a, 18b, 18c. According to FIG. 6 two piece goods 2a* and 2b* are gripped asymmetrically from the unit 8 by the manipulator 5 and are transferred to a target position P1. The jointly gripped piece goods 2a*, 2b* are rotated by 90° so that the piece goods 2a*, 2b*, originally arranged next to each other in the transport direction TR, are arranged in the target position P1 one behind the other in the transport direction TR. Meanwhile, the piece good 2c of the unit 8 is moved with unchanged transport speed v6 by the horizontal conveying device 6 in transport direction TR (see FIGS. 6 to 9).

The gripper jaws 52 of the manipulator 5 are variable in distance to each other, that is, the distance between the gripper jaws 52 can be variably adjusted according to the number and/or type and/or size of the piece goods 2 to be gripped. To grip a unit 9 comprising four piece goods 2a, 2b, in particular consisting of two piece good groups 7a, 7b, the gripper jaws 52 are being respectively spaced further apart (see FIGS. 10 and 11). Unit 9 is moved by the manipulator 5 to a target position P2 on the horizontal conveyor 6 whereby unit 9 is rotated by 90° during this movement. The piece good group 7c comprising two piece goods 2c, is meanwhile moving through the horizontal conveyor 6 in transport direction TR with unchanged transport speed v6 (see FIGS. 12 and 13). Even though in the example shown the manipulator 5 only jointly grips piece goods 2a, 2b of rows 1a, 1b, it may also be possible and/or necessary to pick up piece goods 2a, 2b, 2c of all three rows 1a, 1b, 1c simultaneously, depending on the layer scheme to be generated. Alternatively, or additionally it might be necessary to grab piece goods 2b, 2c of rows 1b, 1c at the same time and to transport ungrabbed piece goods 2a of row 1a with unchanged transport speed v6 instead etc. It may also be provided, for example, that by a grouping belt 18a a group 7a of two piece goods 2a is separated from the row 1a which is fed in via the transport device 3a, the piece good group 7a is then seized by the manipulator 5 and transferred to a target position, while the piece goods 2b, 2c of the rows 1b, 1c are fed unchanged to the grouping module 20. Further variants are conceivable for the technical expert and should also be included in the application.

Figure 14:
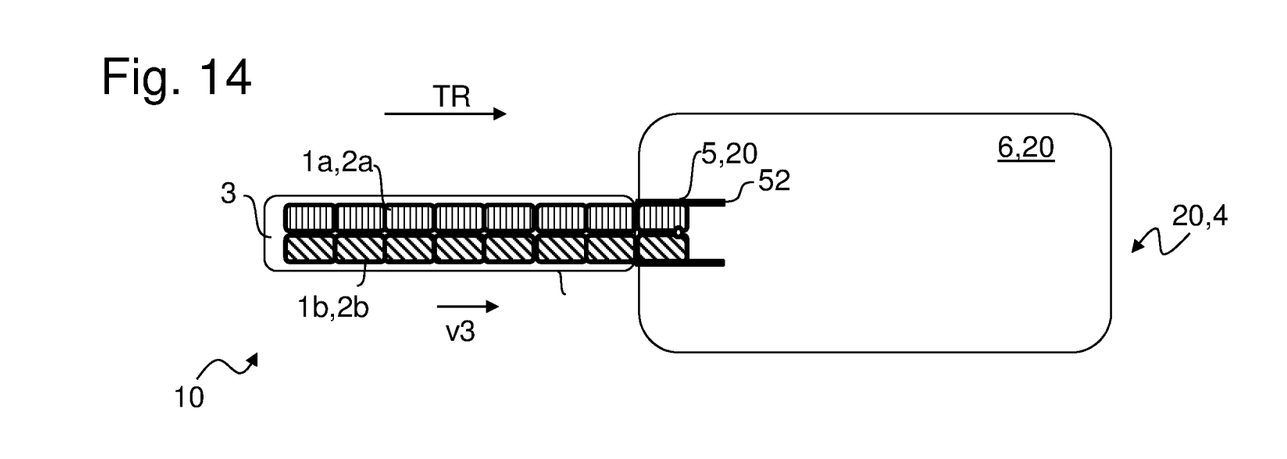
FIG. 14 shows another possibility of seizing piece goods that are being fed in at least two parallel rows.

The further schematic top view of FIG. 14 shows a further possibility of picking up piece goods 2a, 2b that are fed in at least two parallel rows 1a, 1b. In the embodiments shown in FIGS. 1 to 13, a gap is always formed between the piece goods 2a, 2b and/or 2c to be picked up and the subsequent piece goods 2a, 2b and/or 2c of the rows 1a, 1b and/or 1c. The gripper jaws 52 of the manipulator 5 are arranged perpendicular to the transport direction TR and grab up the distanced piece goods 2a, 2b and/or 2c accordingly. According to the embodiment shown in FIG. 14, the manipulator 5 can also be used with gripper jaws 52 arranged parallel to the transport direction TR in order to grab piece goods 2a, 2b that are arriving without gaps between each other in adjacent parallel rows 1a, 1b.

In all embodiments shown here, symmetrical or asymmetrical gripping of piece goods 2a, 2b, 2c can be performed by the manipulator 5. Symmetrical gripping means, in particular, the uniform charging of the manipulator 5 with piece goods 2a, 2b and/or 2c as shown, for example, in FIG. 4. Asymmetrical gripping is understood in particular as the situation when the at least one piece good 2a*, 2b* and/or 2c* seized by the manipulator 5 is not centrally or symmetrically seized and positioned in relation to a vertical central and/or rotational axis of the manipulator 5 or its gripper jaws 52 while the piece good is shifted and/or moved in the direction of the target position P1, P2, if necessary with simultaneous rotation. This equally applies to two or more seized piece goods 2a*, 2b* and/or 2c*, which can also be clamped eccentrically or asymmetrically by the manipulator 5.

The embodiments, examples and variants described in the preceding paragraphs, the claims or the following description and the Figures, including their different views or respective individual features, may be used independently of one another or in any combination. Features described in conjunction with an embodiment are applicable to all embodiments, provided that the features are not incompatible. The invention was described with reference to preferred embodiments. It is conceivable for a technical expert that modifications or amendments of the invention can be made without leaving the scope of protection of the claims below. It is possible to use some of the components or features of one example in combination with components or features of another example.

LIST OF REFERENCE CHARACTERS 1, 1a, 1b, 1c row
2, 2a, 2b, 2c piece good
2, 2a*, 2b*, 2c* seized piece good
3, 3a, 3b, 3c transport device
4 seizing range
5 manipulator
6 horizontal conveying device
7, 7a, 7b, 7c piece good group
8 unit
9 unit
10 handling apparatus
15 control device
18, 18a, 18b, 18c grouping belt
20 grouping module
52, 52a, 52b gripping jaw
L gap
P1, P2 target position
TR transport direction
v3 transport speed
v6 transport speed

The invention claimed is:

1. A method for handling piece goods (2) moved in at least two parallel rows (1) in a transport direction (TR) for forming a palletizable layer or partial layer, the layer comprising a plurality of piece goods (2), comprising:
   seizing at least two piece goods (2) transported beside each other in parallel rows (1) orthogonal to the transport direction (TR) together in a clamping and/or force-locking and/or form-locking manner,
   spatially separating the seized at least two piece goods (2) from the at least two parallel rows (1); and
   transferring the at least two seized piece goods (2) into a specified relative target position (P1, P2) and/or target alignment in relation to subsequent piece goods (2); and
   in a subsequent step, seizing at least one piece good (2) from one of the at least two parallel rows (1) in a clamping and/or force-locking and/or form-locking manner, spatially separating the seized at least one piece good (2) from the row (1), and transferring the at least one piece good (2) into a specified relative target position (P1, P2) and/or target alignment in relation to subsequent piece goods (2).

2. The method of claim 1, further comprising transporting the piece goods (2) in the at least two parallel rows (1) are largely without gaps between one another.

3. The method of claim 2, further comprising feeding the piece goods (2) into each of the at least two parallel rows (1), in the transport direction (TR), without gaps between one another or with minimal gaps between one another as a closed formation.

4. The method of claim 2, further comprising forming groups (7) of one or more piece goods (2) within at least one of the at least two parallel rows (1), wherein the groups (7) are spaced from one another in a transport direction (TR) by defined gaps (L), wherein the defined gaps (L) between successive groups (7) are the same or different.

5. The method of claim 4, wherein the formed groups (7) in each of the at least two parallel rows (1) correspond to each other.

6. The method of claim 5, wherein individual piece goods (2) and/or groups (7) of piece goods (2) of the at least two directly adjacent parallel rows (1) are jointly seized, spatially separated and brought into a defined relative target position (P1, P2) and/or target alignment relative to subsequent piece goods (2), wherein the individual piece goods (2) and/or groups (7) of piece goods (2) within each row (1) are correspondingly separated by a gap (L) from the subsequent piece goods within the respective row (1).

7. The method of claim 6, wherein the transferring step comprises: rotating the seized piece goods (2) moving the seized piece goods (2) in alignment relative to the subsequent piece goods (2) in the transport direction (TR), or moving the seized piece goods (2) with a lateral offset with respect to the subsequent piece goods (2).

8. An apparatus (10) for handling piece goods (2) moved in at least two parallel rows (1), the apparatus (10) comprising:
at least one manipulator (5) for seizing piece goods (2); and
at least one transport device (3) that transports piece goods (2) arranged in at least two parallel rows (1) in a transport direction (TR) into a seizing range (4) of the at least one manipulator (5),
wherein the at least one manipulator (5) seizes at least two piece goods (2) transported beside each other in parallel rows (1) orthogonal to the transport direction (TR) in a clamping and/or force-locking and/or form-locking manner, and separates and transfers the at least two piece goods (2) from the at least two parallel rows (1) to a target position (P1, P2) and/or target alignment; and
wherein the at least one manipulator (5) seizes at least one piece good (2) from one of the at least two parallel rows (1) in a clamping and/or force-locking and/or form-locking manner, and separates and transfers the at least one piece good (2) to a target position (P1, P2) and/or target alignment.

9. The apparatus (10) of claim 8, wherein the at least one manipulator (5) seizes at least one foremost piece good (2) from the at least two parallel rows (1).

10. The apparatus (10) of claim 8, wherein the manipulator (5) comprises at least two clamping elements and/or gripping elements (52) that are adjustable relative to one another, wherein in a first working position the clamping elements and/or gripping elements (52) are arranged or can be arranged parallel to the transport direction (TR).

11. The apparatus (10) claim 8, further comprising at least one grouping belt (18), wherein the at least one grouping belt (18) forms defined gaps (L) between the piece goods (2) supplied in at least two parallel rows (1) and the subsequent piece goods (2) and/or forms defined gaps (L) between groups (7) comprising at least two piece goods (2) each and the subsequent piece goods (2).

12. The apparatus (10) of claim 11, wherein in a second working position, the clamping elements and/or gripping elements (52) are arranged or can be arranged perpendicular to the transport direction (TR).

13. The apparatus (10) of claim 12, wherein one of the clamping elements and/or gripping elements (52) is positioned in the transport direction (TR) behind the at least one piece good (2) to be separated or the group (7) of piece goods (2) to be separated, and within a gap (L) between the at least one piece good (2) to be separated or the group (7) to be separated and the subsequent piece goods (2), and wherein the other clamping element and/or gripping element (52) is arranged in the transport direction (TR) in front of the at least one piece good (2) to be separated or the group (7) to be separated.

14. A conveying, processing, and/or packaging facility for piece goods (2) comprising:
an apparatus (10) for handling piece goods (2) moved in at least two parallel rows (1), the apparatus (10) comprising:
at least one manipulator (5) for seizing piece goods (2); and
at least one transport device (3) that transports piece goods (2) arranged in at least two parallel rows (1) in a transport direction (TR) into a seizing range (4) of the at least one manipulator (5),
wherein the at least one manipulator (5) seizes at least two piece goods (2) transported beside each other in parallel rows (1) orthogonal to the transport direction (TR) in a clamping and/or force-locking and/or form-locking manner, and separates and transfers the at least two piece goods (2) from the at least two parallel rows (1) to a target position (P1, P2) and/or target alignment; and
wherein the at least one manipulator (5) seizes at least one piece good (2) in a clamping and/or force-locking and/or form-locking manner, and separates and transfers the at least one piece good (2) to a target position (P1, P2) and/or target alignment.

* * * * *